July 14, 1953     P. ROSENBERG     2,645,264
WEDGE NUT AND STRUCTURE EMPLOYING WEDGE NUTS
Original Filed Feb. 10, 1945
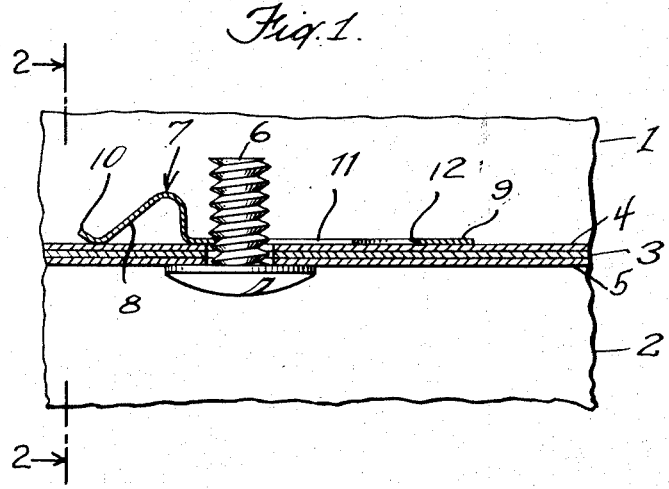
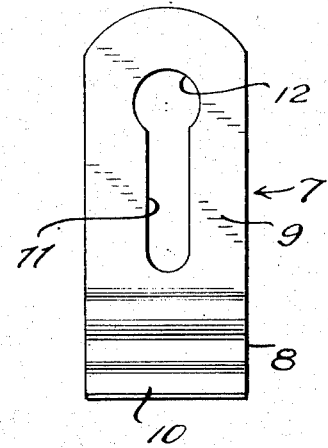
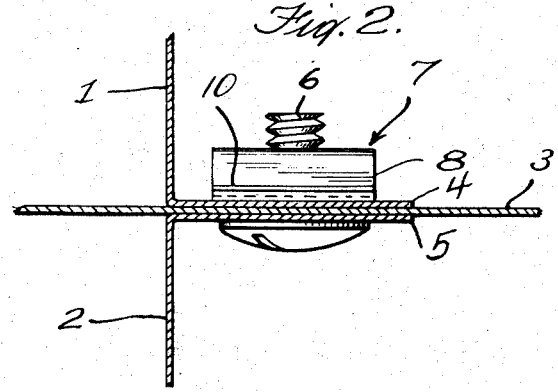
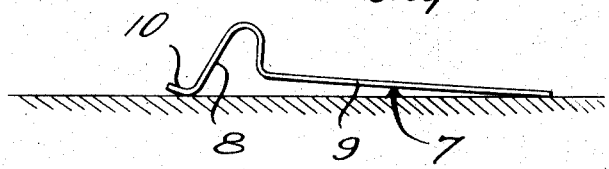
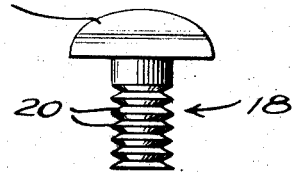
Inventor
PHILIP ROSENBERG
By
Moses, Nolte, Crews & Berry
Attorneys Patented July 14, 1953

2,645,264

UNITED STATES PATENT OFFICE 2,645,264

WEDGE NUT AND STRUCTURE EMPLOYING WEDGE NUTS

Philip Rosenberg, New York, N. Y., assignor to Universal Steel Equipment Corporation, Long Island City, N. Y., a corporation of New York Original application February 10, 1945, Serial No. 577,194. Divided and this application November 17, 1950, Serial No. 196,110

1 Claim. (Cl. 151—38)

This invention relates to wedge lock nuts which are adapted to be used with through fasteners such as screws, bolts or grooved pins, the nuts being used for holding the through fasteners securely in place and for cooperating with them to clamp together the parts which they are designed to join.

It often happens when metallic parts are being assembled that conventional bolts and nuts cannot be used to advantage. In some instances space limitations render it extremely awkward to use such conventional turning tools as wrenches and screw drivers, while in other instances space limitations render the use of such tools actually impossible. Even when space is available for the use of the conventional turning tools, the application of nuts to bolts is tedious and time consuming. This is particularly true in operations such as the fabrication of metallic cabinets because of the large number of bolt and nut connections required.

It is primarily the object of the present invention to provide a wedge lock nut which can be applied quickly and conveniently to a conventional bolt or screw without relative turning, and which is adapted to be used as a substitute for the conventional threaded nut.

While the wedge lock nut of the present invention is adapted for use with a grooved pin, as well as with a threaded bolt of low pitch, use with a bolt is generally preferable because a single type of bolt can be used with plates of various thicknesses whereas different designs of grooved pins may be required for different plate thicknesses.

Other objects and advantages will hereinafter appear.

The present application is a division of my pending application Serial No. 577,194, filed February 10, 1945, now abandoned, for Structures Employing Wedge Nuts.

In the drawing forming part of this specification,

Figure 1 is a sectional view, taken upon the line 1—1 of Figure 2, looking in the direction of the arrows, showing the flanges of two flanged sheet metal members held together by a conventional bolt in combination with a novel wedge nut embodying the principle of the present invention;

Figure 2 is a sectional view showing the wedge nut in elevation, the section being taken upon the line 2—2 of Figure 1, looking in the direction of the arrows;

Figure 3 is a plan view of the wedge nut of Figures 1 and 2;

Figure 4 is a view of the wedge nut in substantially the same attitude as shown in Figure 1 but before application to the work; and Figure 5 is a view in elevation showing a circumferentially grooved pin which may be used in place of the bolt of Figures 1 and 2.

In Figures 1 and 2 vertical partition plates 1 and 2 are shown disposed above and below a horizontal plate 3. The plates 1 and 2 are provided respectively with horizontal flanges 4 and 5 which are arranged in contact with upper and lower faces of the plate 3. The plate 3 and the flanges 4 and 5 have aligned openings in them through which the bodies of headed and threaded bolts 6 may be passed. The holes are of substantially the same diameter as the outside diameter of the bolt bodies.

The bolt or screw 6 cooperates with a clamping nut 7 of novel construction. The nut 7 is in the form of a thin sheet of spring metal such as spring steel. At one end of the nut the metal is curved upward and then downward to form an inverted U, the downwardly extending leg 8 continuing downward for a short distance beyond the nut body 9. The lower extremity of the leg 8 is turned outward to provide a base flange 10 which lies in a plane slightly below the plane of the body 9. The body portion 9 of the nut 7 is formed with a keyhole opening comprising a slot portion 11 and an enlarged circular portion 12. The circular portion 12 is at the end of the body remote from the flange 10 while the slot portion 11 extends from the circular portion to a point near the inverted U. The body 9 is thin and flat, extending in a single plane.

When a bolt has been inserted through the openings of the plate 3 and the flanges 4 and 5, the nut 7 can be readily passed down around the threaded body of the bolt. The nut will then stand with its body in a slightly inclined attitude. The nut may then be moved to engage the margins of the slot 11 in grooves at opposite sides of the bolt body by moving the nut bodily toward the right, as viewed in Figure 1. As the nut is moved toward the right it seeks to carry the engaged threads of the bolt up an inclined plane but if the bolt has been held with its head firmly against the lower face of the flange 5 in the beginning it will not be able to move upward and instead the nut itself will be deformed by the pressure of the screw thread. The nut is desirably moved far enough to the right to lodge the body of the bolt in the extreme left hand end of the slot 11, as shown in Figure 1. With this arrangement the flanges 4 and 5 are firmly clamped against the sheet 3. The parts are held firmly against vibration loosening with the nut at one side at least wedged down by the screw thread against the upper face of the flange 4. This forcing down of the nut metal adjacent the inverted U induces a bending of the metal to occur in the U itself. The nut body 9 stands substantially at right angles to the axis of the bolt so that friction prevents any tendency of the nut to shift leftward and relax the hold upon the connected parts.

The nut illustrated is especially advantageous for use in stockroom cabinets in which the conditions of service are such that partitions have to be shifted frequently to change the sizes of the compartments. The initial inclination of the slotted portion of the nut is so gradual that the nut can be applied and removed with the fingers and without resort to the use of tools. The flat flange on the leg 8 facilitates sliding of the nut. The stockroom clerk can re-adjust a partition or partitions at any time.

As an alternative to the employment of the bolt 6 as illustrated in Figures 1 and 2 a headed and grooved pin 18 as illustrated in Figure 5 may be employed. The pin comprises a head 19 and a body part 20, the body part being formed with a series of circumferential grooves as shown. This pin functions in much the same manner that a standard bolt would.

I have described what I believe to be the best embodiments of my invention. I do not wish, however, to be confined to the embodiments shown but what I desire to cover by Letters Patent is set forth in the appended claim.

I claim:

In combination, a plurality of sheet metal members to be united having aligned bores formed in them, a headed screw having its body passed freely through the bores of said members and its head in engagement with the first of said members, and a wedge nut of resilient sheet metal comprising a substantially flat body portion of substantially uniform thickness, said body portion having a keyhole opening which includes a slot disposed toward a first end of the body portion and an enlargement of the slot disposed toward the second end thereof, an inverted U-shaped portion at said first end beyond the slot and having one leg thereof extended integrally from the body portion and upward away from the body plane at the slotted end of the body and the other leg extending in the opposite direction and long enough when in a normal or unstressed condition to extend across and a short distance beyond the body plane of the wedge nut, said other leg terminating in engagement with the second of the united members, said body portion having at least one of its slot margins at the end adjacent the inverted U-shaped portion clamped positively between a thread of the screw and the second united member with cramping deforming pressure to hold the united parts immovable between the screw head and the nut, and to hold the nut positively against dislodgment, the inverted U-shaped portion being yielding enough to permit a slot margin to be wedged down as stated but being stiff enough to resist strongly downward displacement of the nut body into engagement with the second member to be united.

PHILIP ROSENBERG.

References Cited in the file of this patent.

UNITED STATES PATENTS

| Number | Name | Date |
|---|---|---|
| 594,749 | Mitchell | Nov. 30, 1897 |
| 2,203,397 | Taylor | June 4, 1940 |
| 2,285,273 | Hall | June 2, 1942 |
| 2,353,933 | Schneider | July 18, 1944 |
| 2,367,109 | Fay | Jan. 9, 1945 |